United States Patent
Goto et al.

(10) Patent No.: US 10,801,832 B1
(45) Date of Patent: Oct. 13, 2020

(54) INFORMATION PROCESSING APPARATUS

(71) Applicant: FUJI XEROX CO., LTD., Tokyo (JP)

(72) Inventors: Osamu Goto, Kanagawa (JP); Kenta Ogata, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/535,201

(22) Filed: Aug. 8, 2019

(30) Foreign Application Priority Data

Mar. 22, 2019 (JP) .................................. 2019-054410

(51) Int. Cl.
*G01B 11/02* (2006.01)
*H04N 1/00* (2006.01)

(52) U.S. Cl.
CPC ....... *G01B 11/026* (2013.01); *H04N 1/00336* (2013.01); *H04N 1/00891* (2013.01); *H04N 1/00904* (2013.01)

(58) Field of Classification Search
CPC ........ G01B 11/14; G01B 11/026; G01C 3/08; H04N 1/00336; H04N 1/00891
USPC ......................................................... 356/614
See application file for complete search history.

(56) References Cited

U.S. PATENT DOCUMENTS

| | | | |
|---|---|---|---|
| 5,488,468 A | 1/1996 | Kawanishi et al. | |
| 6,621,583 B1 * | 9/2003 | Yoshida | G01C 3/08 356/3.04 |
| 2019/0234765 A1 * | 8/2019 | Miyamoto | G01D 5/2006 |

FOREIGN PATENT DOCUMENTS

JP        2939045 B2    8/1999

* cited by examiner

*Primary Examiner* — Hung Nguyen
(74) *Attorney, Agent, or Firm* — Oliff PLC

(57) ABSTRACT

An information processing apparatus includes: a distance measurement sensor that outputs a voltage according to a distance to a measurement object; and a control unit that supplies power to the distance measurement sensor at preset intervals and stops the power supply after a preset first period has elapsed. When performing control to determine that the measurement object has approached the apparatus in a state where an output voltage from the distance measurement sensor is equal to or higher than a preset threshold value, the control unit supplies power again and stops the power supply after a preset second period has elapsed, and then performs control to determine that the output voltage from the distance measurement sensor is a falsely detected output voltage when the output voltage during the power supply is equal to or higher than a preset voltage.

8 Claims, 12 Drawing Sheets

FIG. 8A  IN CASE WHERE FALSE DETECTION DETERMINATION PROCESSING IS NOT PERFORMED

FIG. 12A  IN CASE WHERE FALSE DETECTION DETERMINATION PROCESSING IS PERFORMED (IN CASE WHERE IT IS FALSE DETECTION)

INFORMATION PROCESSING APPARATUS

CROSS-REFERENCE TO RELATED APPLICATIONS

This application is based on and claims priority under 35 USC 119 from Japanese Patent Application No. 2019-054410 filed Mar. 22, 2019.

BACKGROUND

(i) Technical Field

The present disclosure relates to an information processing apparatus.

(ii) Related Art

Japanese Patent No. 2939045 discloses a distance measurement sensor that improves noise resistance by a shielding effect with a storage case configured to have conductivity and be grounded.

SUMMARY

Aspects of non-limiting embodiments of the present disclosure relate to providing an information processing apparatus and a program capable of preventing a distance measurement sensor from making false detection due to external noise when detecting and controlling the approach of a measurement object using the distance measurement sensor.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing apparatus including: a distance measurement sensor that outputs a voltage according to a distance to a measurement object; and a control unit that supplies power to the distance measurement sensor at preset intervals and stops power supply to the distance measurement sensor after a preset first period during which power is supplied has elapsed, when performing control to determine that the measurement object has approached the apparatus in a state where an output voltage from the distance measurement sensor is equal to or higher than a preset threshold value, supplies power again and stops the power supply to the distance measurement sensor after a preset second period has elapsed, and then performs control to determine that the output voltage from the distance measurement sensor is a falsely detected output voltage when the output voltage during power supply to the distance measurement sensor is equal to or higher than a preset voltage.

BRIEF DESCRIPTION OF THE DRAWINGS

Exemplary embodiments of the present invention will be described in detail based on the following figures, wherein:

FIG. 5 is a diagram illustrating a state of the PSD 42 when a photodiode 61 is turned on;

FIGS. 8A-8D are a diagram illustrating a timing chart in the processing in a case where the false detection determination processing illustrated in the flowchart of FIG. 7 is not performed;

FIGS. 11A-11D are a diagram illustrating a timing chart in the case of non-false detection in a case where the false detection determination processing is performed, and FIGS. 12A-12D are a diagram illustrating a timing chart in the case of false detection in a case where false detection determination processing is performed.

DETAILED DESCRIPTION

Next, exemplary embodiments of the present disclosure will be described in detail with reference to drawings.

Figure 1:
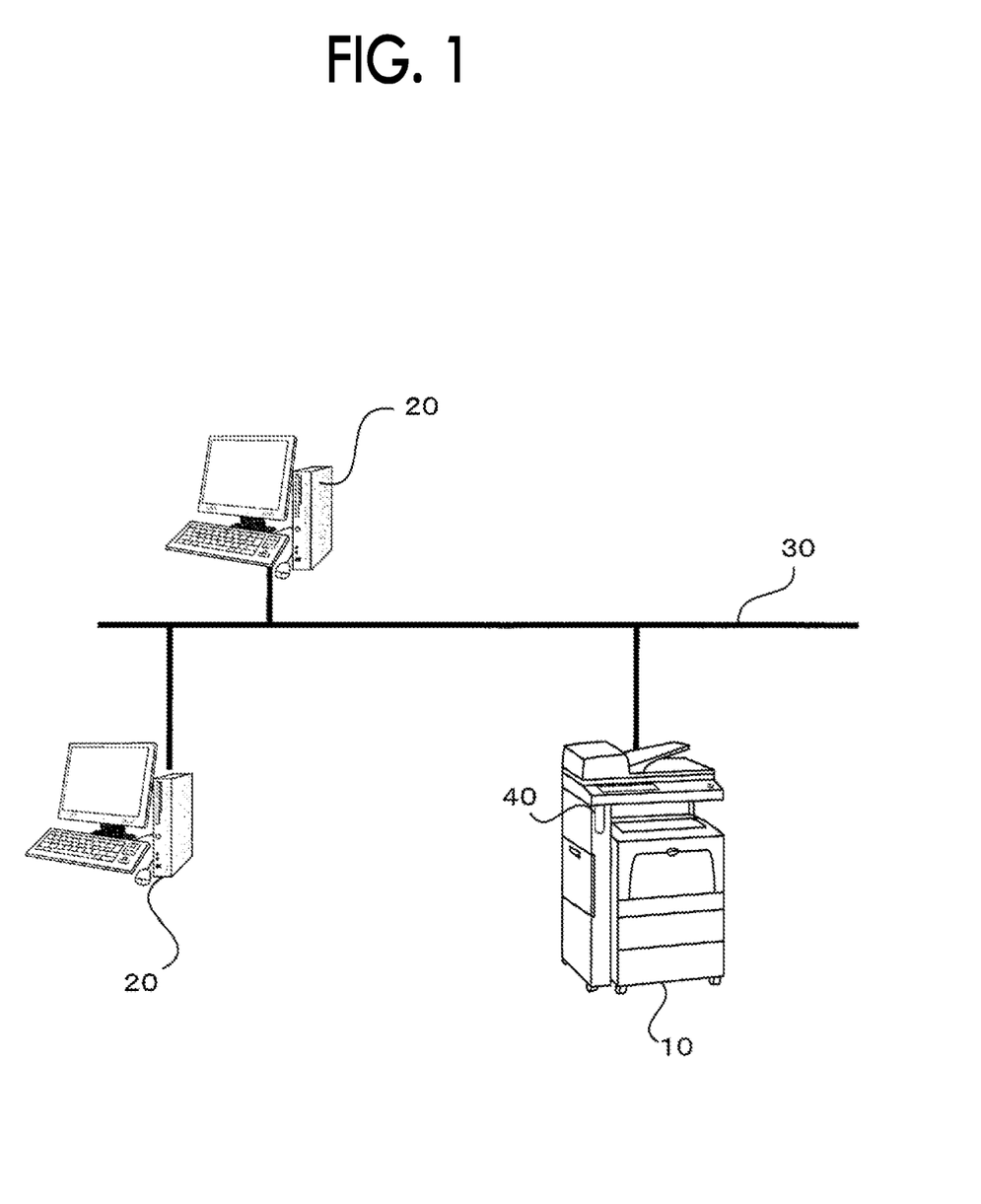
FIG. 1 is a diagram illustrating a system configuration of an image forming system according to an exemplary embodiment of the present disclosure.

FIG. 1 is a system diagram illustrating the configuration of an image forming system according to an exemplary embodiment of the present disclosure.

An image forming system according to the exemplary embodiment of the present disclosure is configured with an image forming apparatus 10 and a terminal device 20 mutually connected by a network 30, as shown in FIG. 1. The terminal device 20 generates print data and transmits the generated print data via the network 30 to the image forming apparatus 10. The image forming apparatus 10 receives the print data transmitted from the terminal device 20 and outputs an image corresponding to the print data on a sheet. The image forming apparatus 10 is a so-called multifunction machine having plural functions such as a printing function, a scanning function, a copying function, and a facsimile function.

The image forming apparatus 10 according to the present exemplary embodiment turns off the power of the main units and enters a power saving mode (or standby mode) when an operation is not performed for a predetermined time to save energy. Then, the image forming apparatus 10 is set to supply power to each unit and turn into a normal operation mode when a user performs a button operation or print data is transmitted from the terminal device 20.

A distance measurement sensor 40 is provided on the front of the image forming apparatus 10. The distance measurement sensor 40 has a function of measuring the distance to an object located in front of the image forming apparatus 10. Then, in the image forming apparatus 10 of the present exemplary embodiment, a human-body detection system is realized by using the distance measurement sensor 40.

Figure 2A:
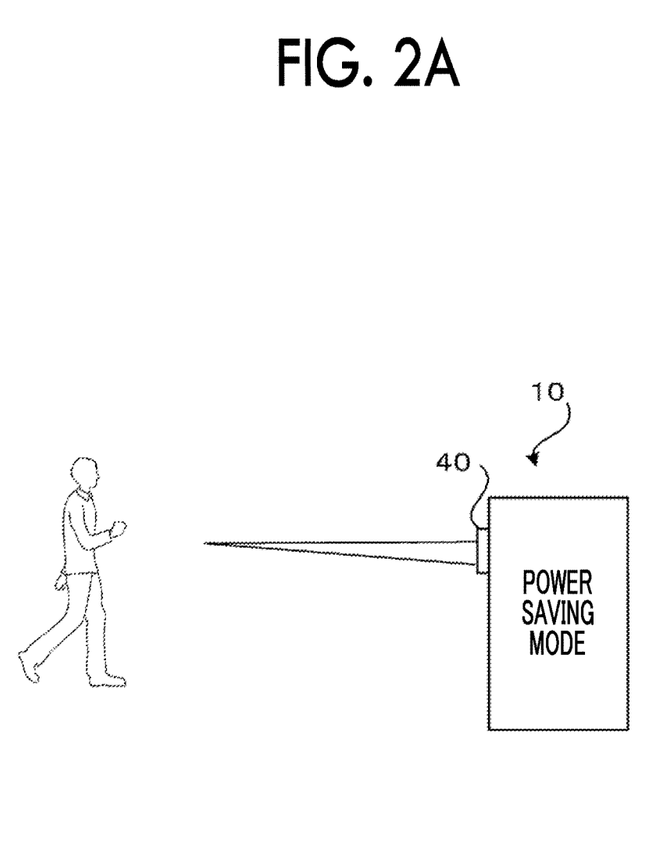
FIGS. 2A and 2B are diagrams for describing control by a human-body detection system using a distance measurement sensor 40.
Figure 2B:
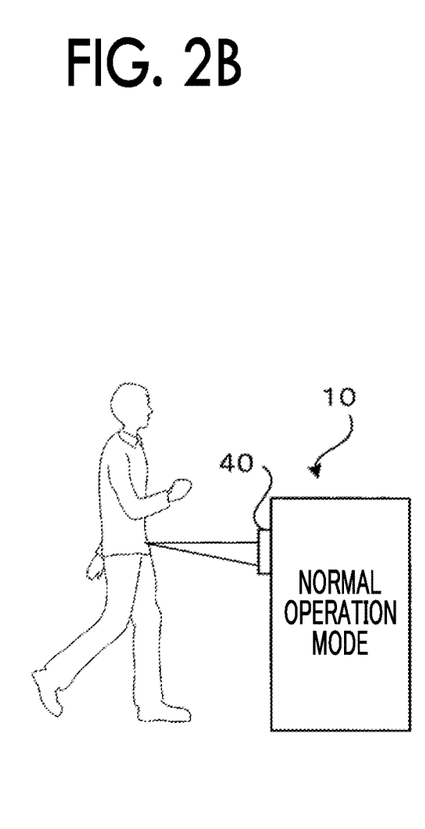

Specifically, as shown in FIG. 2A, when the image forming apparatus 10 in the power saving mode detects the distance to the user approaching the image forming apparatus 10 by the distance measurement sensor 40 and the user closer than a preset distance is detected, as shown in FIG. 2B, processing is performed in the state of the normal operation mode.

By performing such processing, the image forming apparatus 10 enters the normal operation mode only when the user approaches to use the image forming apparatus 10. Therefore, when the user arrives in front of the image forming apparatus 10, the normal operation mode is already set, and the user can quickly perform processing such as copying.

Figure 3:
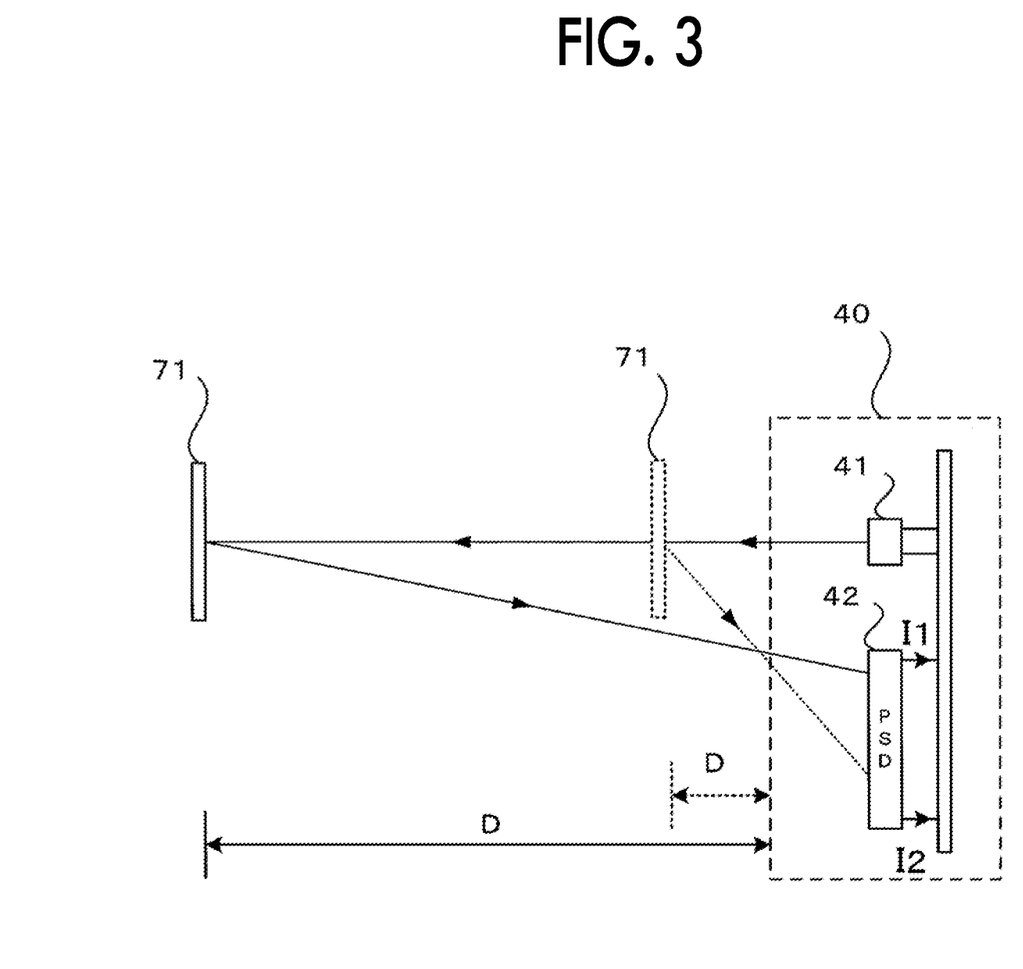
FIG. 3 is a diagram for describing a structure of the distance measurement sensor 40.

Next, the structure of the distance measurement sensor 40 will be described with reference to FIG. 3.

The distance measurement sensor 40 includes an LED 41 and a position sensitive detector (PSD) 42. FIG. 3 is a diagram for describing the operation principle and structure of the distance measurement sensor 40, and the structure of an optical system such as a lens will be omitted.

The LED 41 emits light to a measurement object 71 that the user or the like wants to measure. The light emitted by the LED 41 is reflected by the measurement object 71 and enters the PSD 42. Then, the spot position where the reflected light from the measurement object 71 is incident on the PSD 42 changes according to a distance D between the measurement object 71 and the distance measurement sensor 40.

That is, this spot position changes in a case where the position of the measurement object 71 is far from the distance measurement sensor 40 and the distance D is long, and the case where the position of the measurement object 71 is close to the distance measurement sensor 40 and the distance D is short.

The PSD is configured such that output currents I1 and I2 change in accordance with the spot position where the reflected light is incident. Therefore, the spot position is specified by measuring the output powers I1 and I2 and the distance D to the measurement object is calculated by triangulation from the spot position, the distance between the PSD 42 and the LED 41, and the like.

Here, the PSD 42 has a structure in which a resistor and a photodiode are combined and elongated horizontally. The outline of the structure of this PSD 42 is illustrated in FIG. 4.

Figure 4:
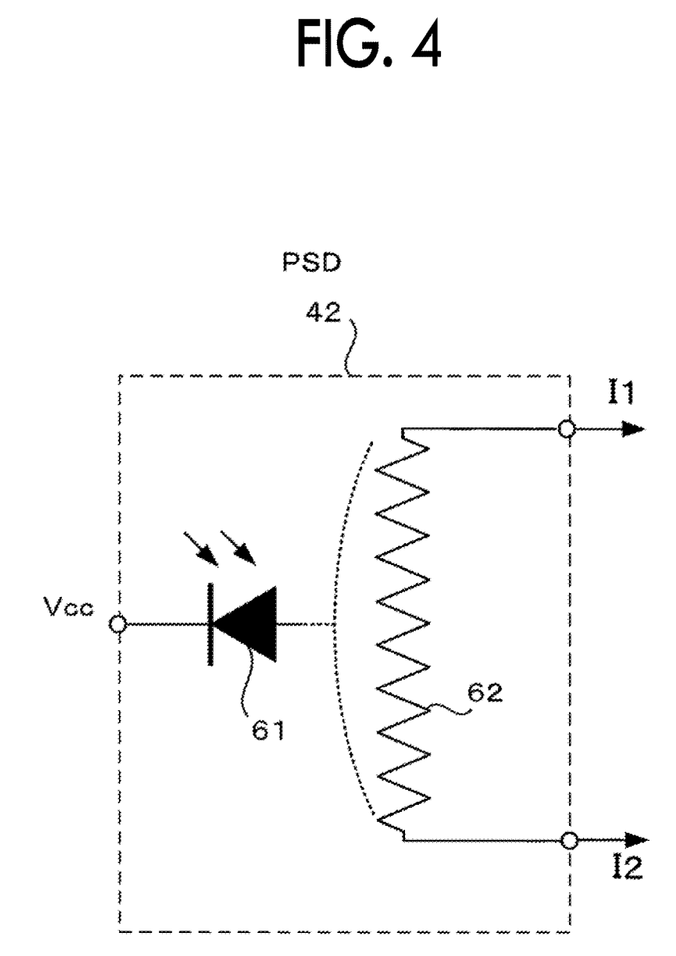
FIG. 4 is a diagram illustrating the outline of a structure of a PSD 42.

The PSD 42 is configured with a photodiode 61 and a resistor 62, as shown in FIG. 4. When the reflected light is incident, carriers are generated at the spot position and a current flows, and the photodiode 61 is turned on. When turned on, the photodiode 61 is structured to be connected to the resistor 62 at this spot position.

Figure 5:
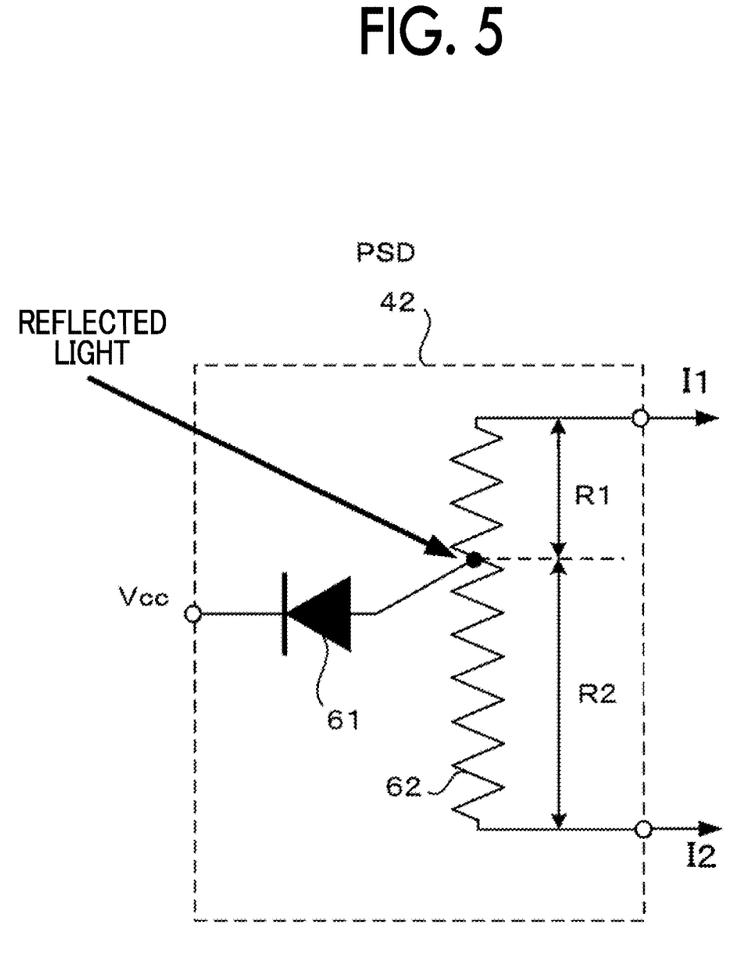

A state in which the photodiode 61 is turned on is shown in FIG. 5. FIG. 5 shows a state in which the photodiode 61 is connected to a position according to the spot position of the resistor 62, and it is understood that the resistor 62 is divided into two resistors of resistance values R1 and R2 with the connection position as a boundary.

One end of the photodiode 61 is connected to a power supply voltage Vcc of 5 V, and the output currents I1 and I2 are output from both ends of the resistor 62.

With such a structure, when the photodiode 61 is turned on, the output currents I1 and I2 from the distance measurement sensor 40 become current values inversely proportional to the division ratio of the two resistance values R1 and R2.

Next, the system configuration of the human-body detection system using the distance measurement sensor 40 will be described with reference to FIG. 6.

Figure 6:
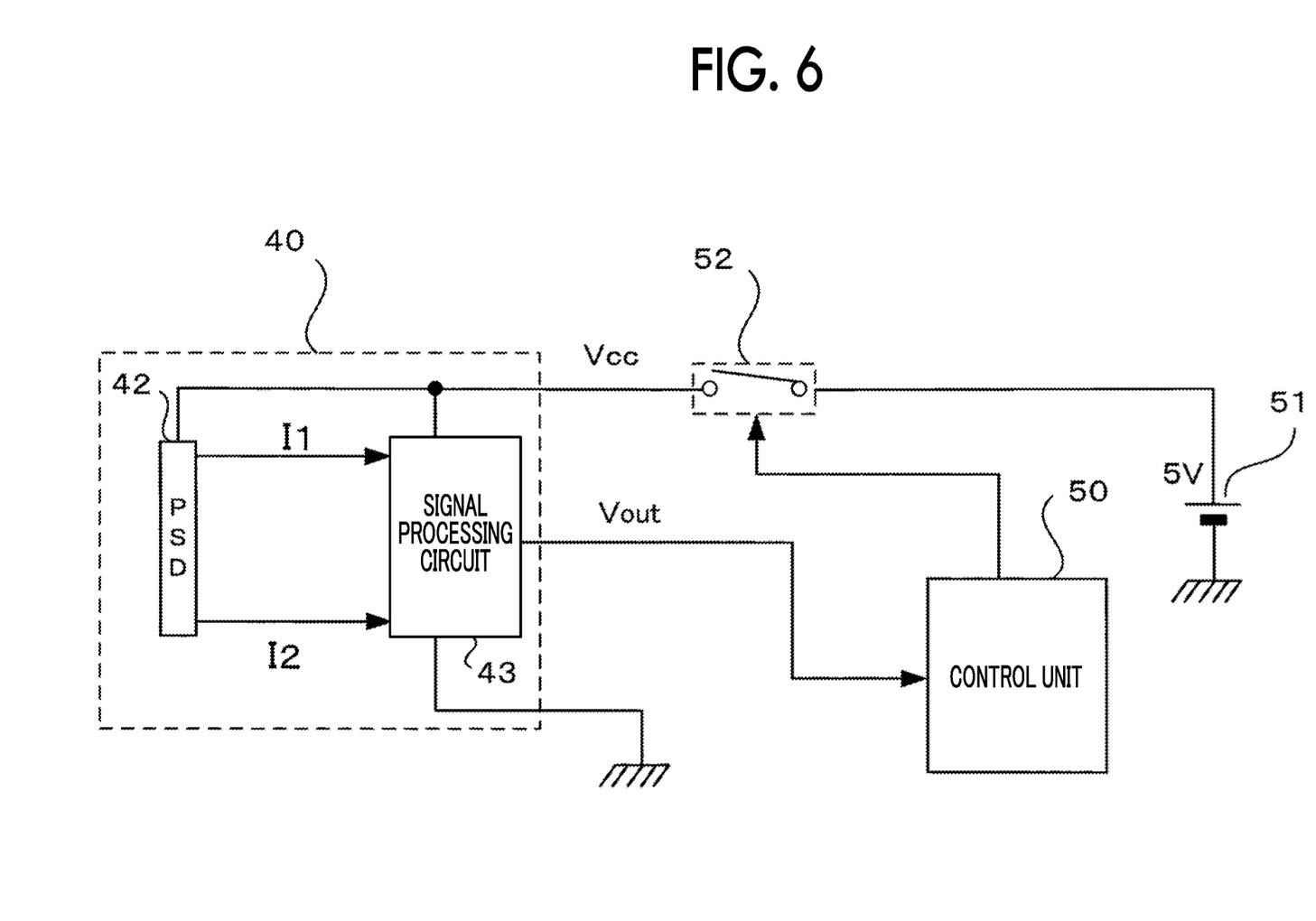
FIG. 6 is a diagram for describing a system configuration of the human-body detection system using the distance measurement sensor 40.

Referring to FIG. 6, the distance measurement sensor 40 is provided with a signal processing circuit 43, and the signal processing circuit 43 receives the output currents I1 and I2 from the PSD 42 and outputs an output voltage Vout. The output voltage Vout is set such that the voltage value increases as the distance D to the measurement object 71 illustrated in FIG. 3 decreases, and the voltage value decreases as the distance D to the measurement object 71 increases. That is, the distance measurement sensor 40 outputs a voltage corresponding to the distance to the measurement object as the output voltage Vout.

The output voltage Vout from the distance measurement sensor 40 is input to a control unit 50 that controls the operation of the image forming apparatus 10.

The control unit 50 detects the approach of the user to the user's image forming apparatus based on the voltage value of the output voltage Vout and performs control such that the power saving mode is set to the normal operation mode.

Specifically, when the output voltage Vout from the distance measurement sensor 40 becomes equal to or higher than a preset threshold value, for example, 1 V or more, the control unit 50 sets the power saving mode to the normal operation mode, that is, performs control to turn on the power of the image forming apparatus.

In the following description, setting the power saving mode to the normal operation mode is expressed as turning the power on, and setting the normal operation mode to the power saving mode is expressed as turning the power off.

The distance measurement sensor 40 is supplied with the power supply voltage Vcc from a 5 V power supply 51 via a switch 52. The control unit 50 controls the switch 52 to switch on/off the power supply voltage Vcc to the distance measurement sensor 40.

It is not efficient from the viewpoint of power saving to always supply the power supply voltage Vcc to the distance measurement sensor 40. Therefore, the control unit 50 controls the switch 52 to intermittently supply the power supply voltage Vcc to the distance measurement sensor 40. For example, in the present exemplary embodiment, in the power saving mode, the control unit 50 performs control such that the power supply voltage Vcc is supplied to the distance measurement sensor 40 for 50 ms every 500 ms.

However, since the current generated on the above-described PSD 42 is very fine, under the influence of external noise, false detection may occur. That is, although the user is not approaching the image forming apparatus 10, the output voltage Vout may be output and the power of the apparatus may be turned on.

Therefore, in the image forming apparatus 10 of the present exemplary embodiment, even when the output voltage Vout from the distance measurement sensor 40 becomes 1 V or more, which is the preset threshold value, the control unit 50 performs false detection determination processing to determine whether or not the output voltage Vout exceeding the threshold voltage is a false detection or not, instead of immediately turning on the power of the image forming apparatus. When it is determined that the output voltage Vout from the distance measurement sensor 40 is a falsely detected output voltage, the control unit 50 does not perform control to turn on the power of the image forming apparatus.

Then, the control unit 50 performs false detection determination processing, and, when it is determined that the output voltage Vout from the distance measurement sensor 40 is not a falsely detected output voltage, performs control to turn on the power of the image forming apparatus.

Next, the operation of the image forming apparatus 10 of the present exemplary embodiment will be described in detail with reference to drawings.

First, the operation in a case where the false detection determination processing is not performed in the image forming apparatus 10 of the present exemplary embodiment will be described with reference to the flowchart of FIG. 7.

In a case where the false detection determination processing is not performed, the control unit 50 turns off the power supply voltage Vcc in step S101, waits for 500 ms in step S102, and turns on the power supply voltage Vcc in step S103. Then, after waiting for 50 ms in step S104, the control unit 50 determines whether or not the output voltage Vout from the distance measurement sensor 40 is 1 V or more in step S105.

Then, when the output voltage Vout is not 1 V or more, the control unit 50 repeats the processing of steps S101 to S104.

Then, when it is determined in step S105 that the output voltage Vout is 1 V or more, the control unit 50 determines that the user is approaching the image forming apparatus and turns on the power of the image forming apparatus 10 in step S106.

Figure 7:
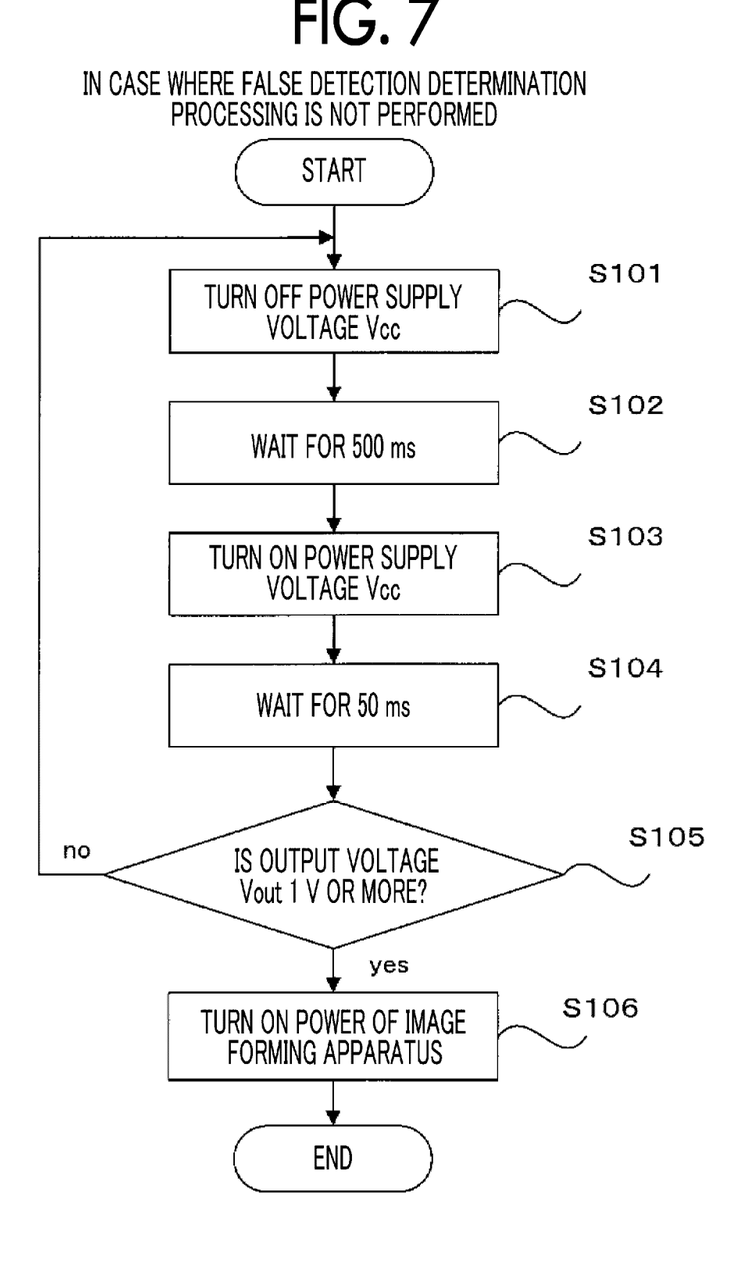
FIG. 7 is a flowchart for describing an operation in a case where false detection determination processing is not performed in the image forming apparatus 10 according to the exemplary embodiment of the present disclosure.

FIGS. 8A-8D illustrates a timing chart in the processing in the case where the false detection determination processing illustrated in the flowchart of FIG. 7 is not performed.

Figure 8A:
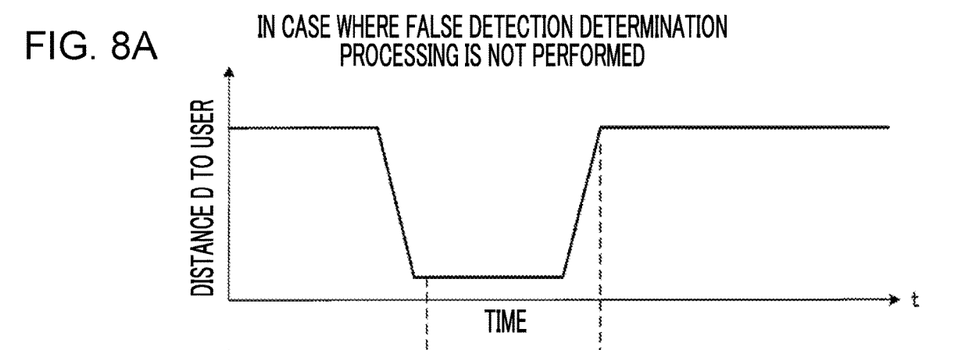
Figure 8B:
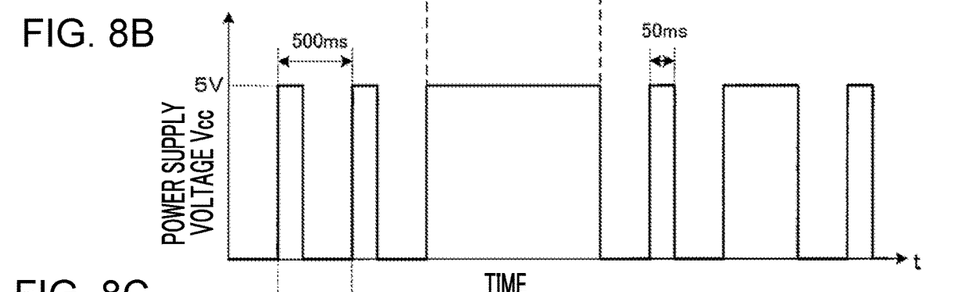
Figure 8C:
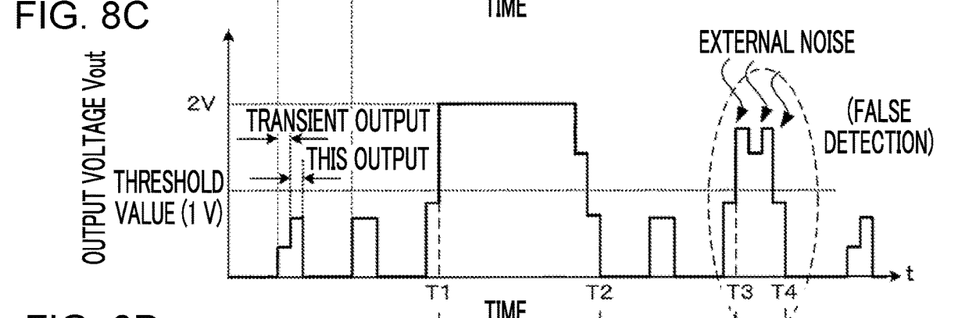
Figure 8D:
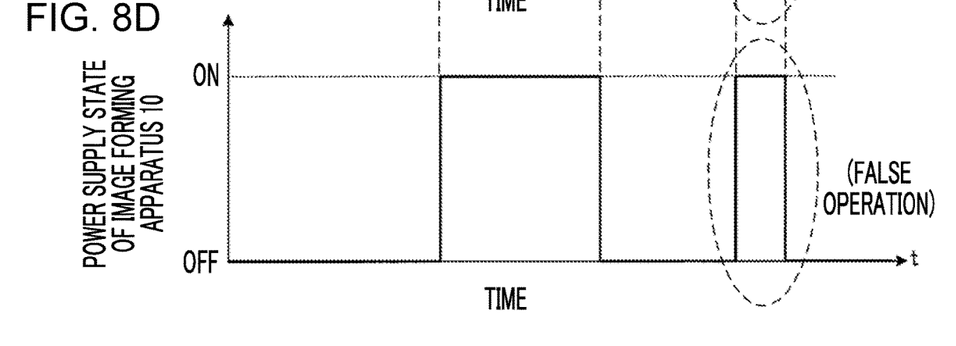

FIG. 8A is a diagram illustrating the distance D to the user, FIG. 8B is a diagram illustrating the voltage value of the power supply Vcc supplied to the distance measurement sensor 40, FIG. 8C is a diagram illustrating the voltage value of the output voltage Vout from the distance measurement sensor 40, and FIG. 8D is a diagram illustrating the power supply state of the image forming apparatus 10.

In FIGS. 8A-8D, the control unit 50 performs control such that the power supply voltage Vcc is supplied to the distance measurement sensor 40 for 50 ms every 500 ms. In a case where the user is not approaching the image forming apparatus 10, the voltage of the output voltage Vout does not reach 1 V, and therefore, the control unit 50 continues to intermittently supply the power supply Vcc.

As illustrated in FIG. 8C, even in a case where the distance D to the user is not short, any voltage is output as the output voltage Vout. Then, after supplying the power supply voltage Vcc, it is understood that the voltage value of the transient output appears as the output voltage Vout and when a period of 50 ms elapses and the operation of the PSD 42 and the signal processing circuit 43 becomes stable, the voltage value of this output is output as output voltage Vout.

As described above, the output voltage from the hardware circuit is generally not stable immediately after being supplied with the power supply voltage, and various control is performed by using an output voltage which is output after a predetermined time has elapsed after the power supply voltage is supplied.

Also in the present exemplary embodiment, the control unit 50 does not perform control using the output voltage Vout immediately after supplying the power supply voltage Vcc to the distance measurement sensor 40 and determines whether or not the user is approaching the image forming apparatus based on the voltage value of the output voltage Vout after 50 ms has elapsed.

Then, the user approaches the image forming apparatus 10, and the distance D to the user becomes short, and it is understood that the voltage value of the output voltage Vout exceeds 1 V at time T1. Therefore, at time T1, the control unit 50 turns on the power of the image forming apparatus.

Thereafter, when the distance D to the user increases and the voltage value of the output voltage Vout is less than 1 V at time T2, the control unit 50 turns off the power of the apparatus.

Here, at time T3, although the user is not approaching the image forming apparatus 10, the output voltage Vout is 1 V or more due to the influence of external noise. Then, the control unit 50 causes the power supply voltage Vcc to be continuously supplied to the distance measurement sensor 40 with the power of the image forming apparatus turned on.

Then, when the voltage value of the output voltage Vout is less than 1 V at time T4, the control unit 50 turns off the power of the image forming apparatus.

That is, although the user is not approaching during the period from time T3 to T4, the power of the image forming apparatus 10 is turned on, which indicates that the operation is false.

Next, false detection determination processing in the image forming apparatus 10 of the present exemplary embodiment will be described.

In the case of performing this false detection determination processing, the control unit 50 supplies power to the distance measurement sensor 40 at preset intervals. In a case where the output voltage Vout from the distance measurement sensor 40 becomes equal to or higher than the preset threshold value, when performing control to determine that the user who is the measurement object has approached the device, the control unit 50 stops the supply of the power supply voltage Vcc to the distance measurement sensor 40 after the elapse of a preset first period during which the power supply voltage Vcc is supplied to the distance measurement sensor 40. Then, the control unit 50 supplies the power supply voltage Vcc again and stops the supply of the power supply voltage Vcc to the distance measurement sensor 40 after a preset second period has elapsed. Thereafter, when the output voltage Vout during the supply of the power voltage Vcc to the distance measurement sensor 40 is equal to or higher than the preset voltage, the control unit 50 performs control to determine that the output voltage Vout from the distance measurement sensor 40 is a falsely detected output voltage.

Specifically, in a case where the control unit 50 is intermittently supplying the power supply voltage Vcc in the power saving mode, even when the output voltage Vout is 1 V or more, the control unit 50 stops the supply of the power supply voltage Vcc to the distance measurement sensor 40 after the elapse of 50 ms which is the first period. Then, the control unit 50 supplies the power supply voltage Vcc again and stops the supply of the power supply voltage Vcc to the distance measurement sensor 40 after the second period 150 ms has elapsed. Thereafter, when the transient output of the output voltage Vout immediately after the supply of the power supply voltage Vcc to the distance measurement sensor 40 is 100 mV or more, the control unit 50 performs control to determine that the output voltage Vout from the distance measurement sensor 40 is a false detection. That is, the control unit 50 does not make switching to the normal operation mode with the image forming apparatus 10 remaining in the power saving mode.

When the transient output of the output voltage Vout is less than 100 mV after the power supply voltage Vcc is supplied in the way as described above, the control unit 50 determines that the output voltage Vout from the distance measurement sensor 40 is not falsely detected but in a normal operation and executes processing of changing the image forming apparatus 10 from the power saving mode to the normal operation mode.

Here, 150 ms which is the second period described above is set to be longer than 50 ms which is the first period. For example, a period three or more times the first period is set as the second period.

The supply of the power supply voltage Vcc to the distance measurement sensor 40 during the second period of 150 ms will be described hereinafter as pre-energization.

Then, the control unit 50 does not determine whether or not the output voltage Vout is falsely detected after one time of pre-energization as described above, but may determine whether or not the output voltage Vout is falsely detected after performing the pre-energization plural times.

Specifically, the control unit 50 stops the supply of the power supply voltage Vcc to the distance measurement sensor 40 after repeating a power supply state during the second period plural times. Thereafter, when the output voltage Vout during the supply of the power voltage Vcc to the distance measurement sensor 40 is 100 mV or more, the control unit 50 may determine that the output voltage Vout from the distance measurement sensor 40 is a falsely detected output voltage.

Furthermore, the control unit 50 may set different power voltage Vcc supply periods during plural second periods. That is, when performing the pre-energization plural times, the control unit 50 may set different supply periods, such as 130 ms, 140 ms, and 260 ms, instead of setting all the periods of the pre-energization as 150 ms.

Furthermore, the control unit 50 may set the voltage values of the power supply voltage Vcc supplied to the distance measurement sensors 40 in plural times of pre-energization as different voltages. For example, the control unit 50 sets the voltage value of the power supply voltage Vcc as different voltage values such as 4.5 V, 5.0 V, and 5.5 V during each power supply of plural times of pre-energization. However, in the circuit diagram illustrated in FIG. 4, since the power supply voltage Vcc is 5 V which is a constant voltage value, a circuit configuration different from the circuit diagram illustrated in FIG. 4 is required.

The control unit 50 may repeat the false detection determination processing as described above plural times and determine whether or not the detection of the measurement object by the distance measurement sensor 40 is false detection based on the results of plural times of determination.

Specifically, when the output voltage Vout from the distance measurement sensor 40 becomes 1 V or more, the control unit 50 stops the supply of the power supply voltage Vcc to the distance measurement sensor 40 after 50 ms has elapsed, stops the supply of the power supply voltage Vcc to the distance measurement sensor 40 after the pre-energization of 150 ms, and thereafter, repeatedly determines whether or not the output voltage Vout during the supply of the power supply voltage Vcc to the distance measurement sensor 40 is 100 mV or more, plural times, and determines whether or not the detection of the measurement object by the distance measurement sensor 40 is false detection based on the results of plural times of determination.

For example, when it is determined that the detection result is false detection twice or more out of three times of determination results, the control unit 50 finally determines that the detection of the measurement object by the distance measurement sensor 40 is false detection.

First, the operation in a case where the above-described false detection determination processing is performed in the image forming apparatus 10 of the present exemplary embodiment will be described with reference to the flowchart of FIG. 9.

Figure 9:
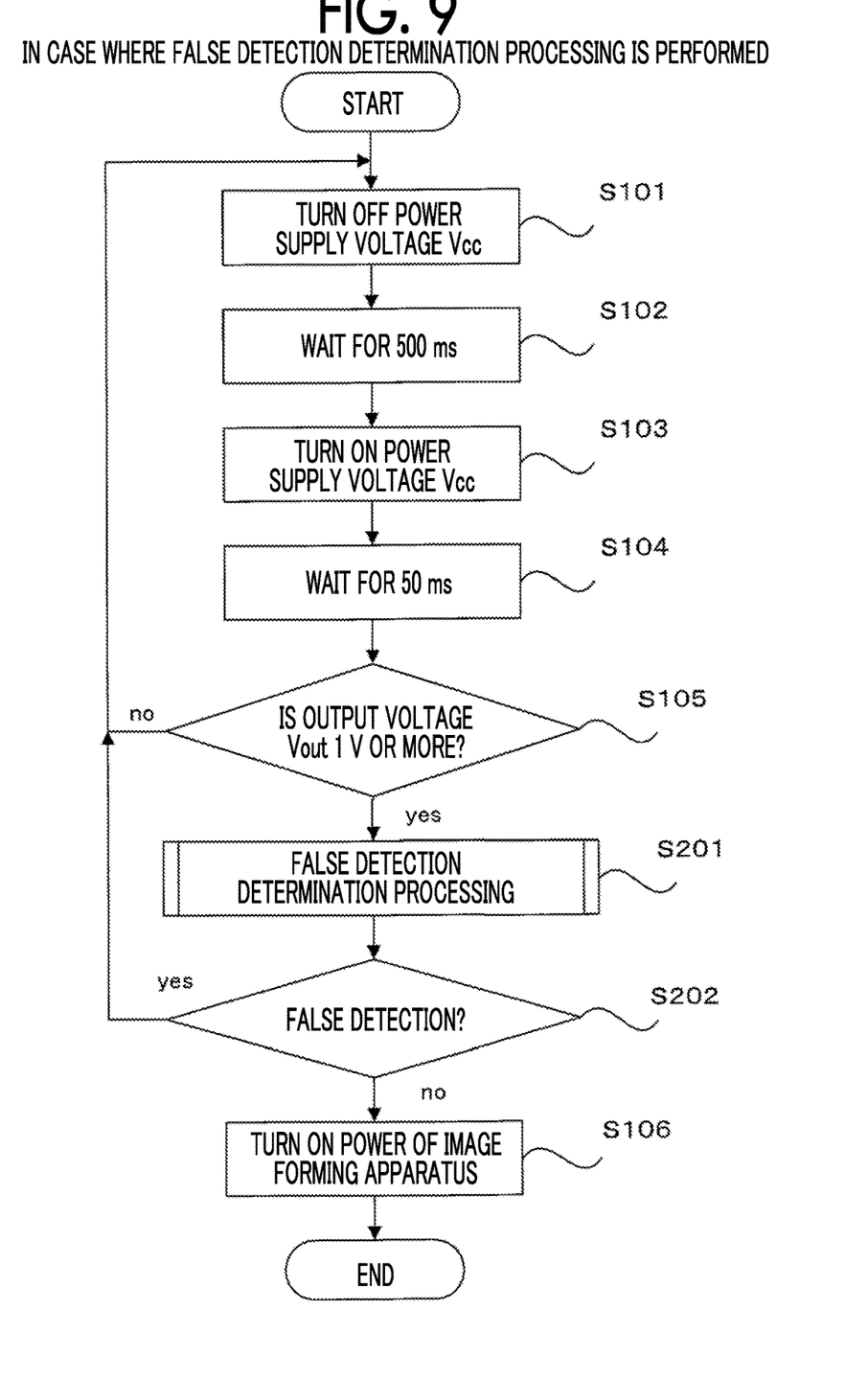
FIG. 9 is a flowchart for describing an operation in a case where the false detection determination processing is performed in the image forming apparatus 10 according to the exemplary embodiment of the present disclosure.

The flowchart in FIG. 9 is a flowchart in which steps S201 and S202 are added to the flowchart in a case where the false detection determination processing illustrated in FIG. 7 is not performed, and therefore, only the added steps will be described.

In the case of performing the false detection determination processing, the control unit 50 performs the false detection determination processing in step S201 when the output voltage Vout from the distance measurement sensor 40 is 1 V or more. Then, when it is determined that the detection of an output voltage Vout of 1 V or more is false detection, the control unit 50 returns to the processing of step S101 in step S202.

On the other hand, when it is determined that the detection of an output voltage Vout of 1 V or more is not false detection, the control unit 50 proceeds to the processing of step S106 in step S202.

Then, in step S106, the control unit 50 turns on the power supply of the image forming apparatus 10.

Next, the details of the false detection determination processing illustrated in step S201 of the flowchart of FIG. 9 will be described with reference to the flowchart of FIG. 10.

First, in step S301, the control unit 50 turns off the power supply voltage Vcc, and after waiting for 50 ms in step S302, turns on the power supply voltage Vcc in step S303. Then, after waiting for 150 ms in step S304, the control unit 50 turns off the power supply voltage Vcc in step S305. The state in which the power supply voltage Vcc is supplied for 150 ms is the pre-energization described above.

Then, after waiting for 50 ms with the power supply voltage Vcc turned on in step S306, the control unit 50 turns on the power supply voltage Vcc again in step S307.

Then, in step S308, the control unit 50 determines whether or not the output voltage Vout from the distance measurement sensor 40 is 100 mV or more.

Then, when the output voltage Vout from the distance measurement sensor 40 is 100 mV or more, in step S309, the control unit 50 determines that the output voltage Vout of 1 V or more is a false detection.

Then, when the output voltage Vout from the distance measurement sensor 40 is less than 100 mV, in step S310, the control unit 50 determines that the output voltage Vout of 1 V or more is not a false detection.

Figure 10:
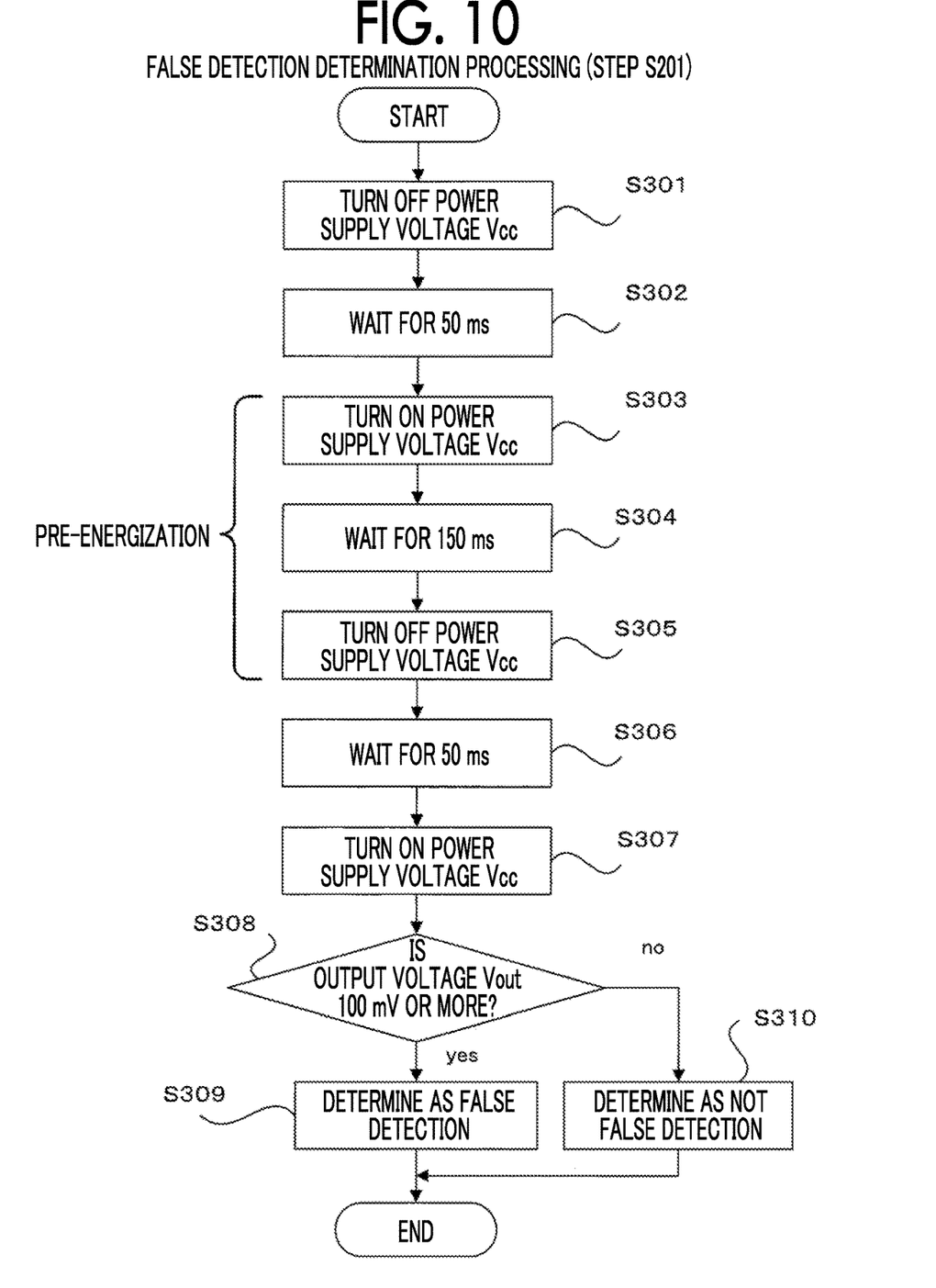
FIG. 10 is a diagram for describing the details of the false detection determination processing illustrated in step S201 of the flowchart of FIG. 9.

Next, timing charts in the case of performing the false detection determination processing illustrated in the flowcharts of FIGS. 9 and 10 are illustrated in FIGS. 11A-11D and FIGS. 12A-12D.

FIGS. 11A-11D are a timing chart in a case where the output voltage Vout exceeding 1 V is not a false detection, and FIGS. 12A-12D are a timing chart in a case where the output voltage Vout exceeding 1 V is a false detection.

Figure 11A:
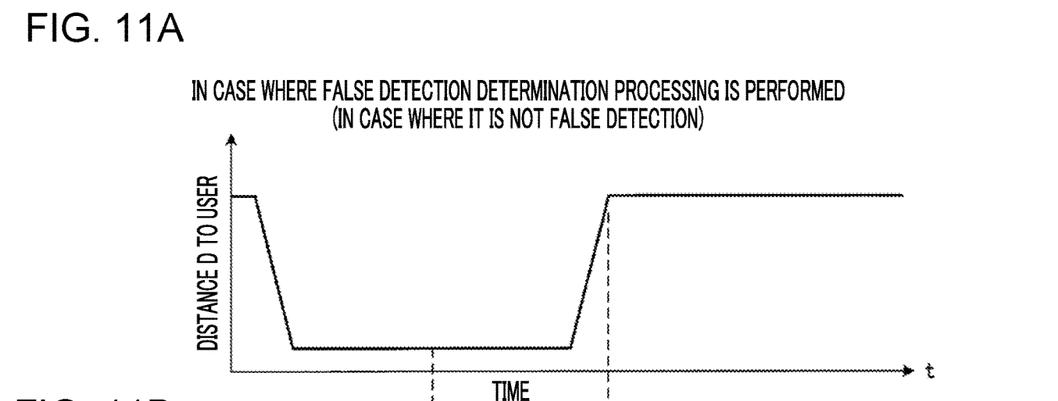
Figure 11B:
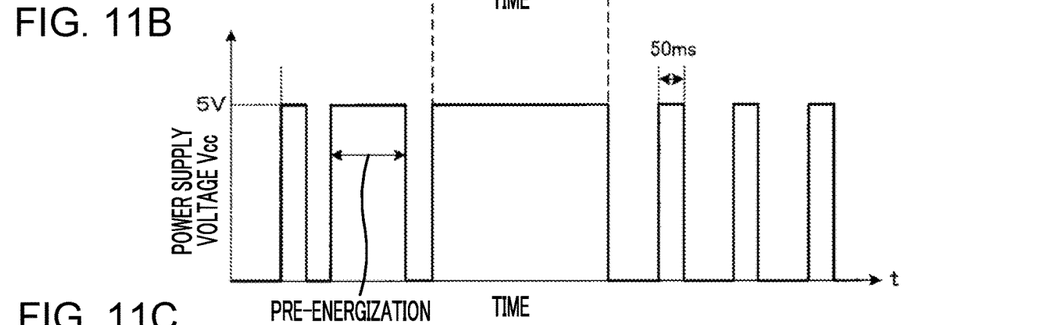
Figure 11C:
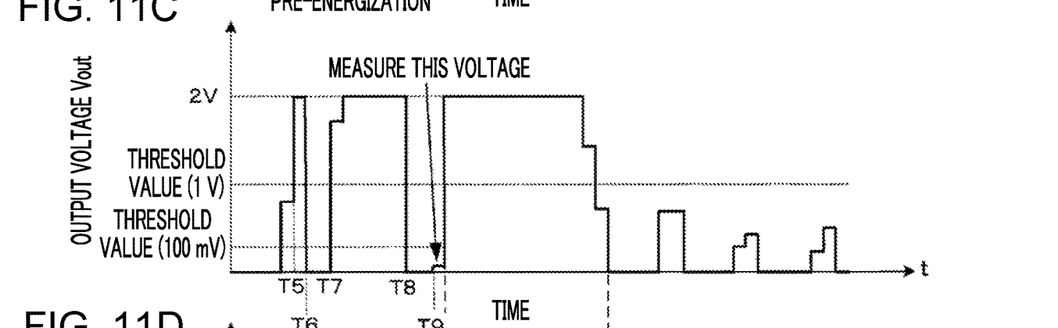
Figure 11D:
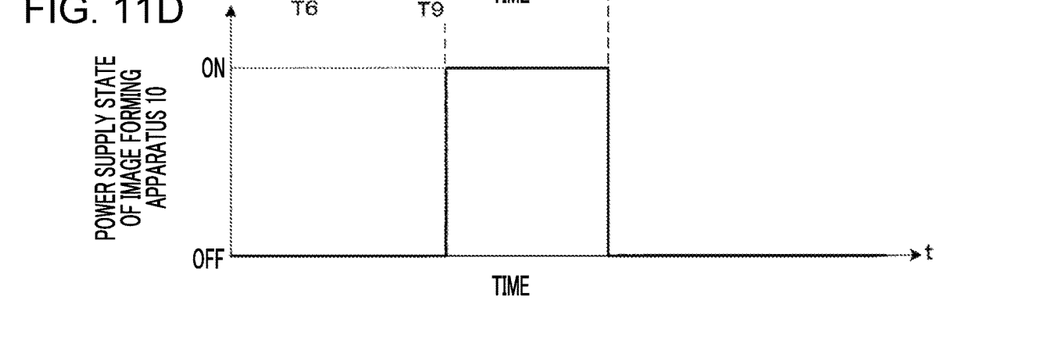

First, a case where the output voltage Vout exceeding 1 V is not a false detection will be described with reference to FIGS. 11A-11D.

When the user approaches the image forming apparatus 10 and the distance D to the user becomes short, at time T5, the voltage value of the output voltage Vout exceeds 1 V. Then, at time T6, the control unit 50 turns off the power supply voltage Vcc. After 50 ms, at time T7, the control unit 50 turns on the power supply voltage Vcc to perform pre-energization for 150 ms.

After the pre-energization, the control unit 50 turns off power supply voltage Vcc at time T8. Then, the control unit 50 turns on the power supply voltage Vcc at time T9 after 50 ms has elapsed.

Then, the control unit 50 measures the voltage value of the transient response of the output voltage Vout immediately after turning on the power supply voltage Vcc. In FIGS. 11A-11D, as the voltage value of the transient response of the output voltage Vout, a voltage value of several mV to several tens of mV is measured, and it is understood that the output voltage Vout is less than 100 mV, which is a threshold value when determining that false detection has occurred.

Therefore, the control unit 50 determines that the current output voltage Vout of 1 V or more is normal detection and turns on the power supply of the image forming apparatus 10.

Figure 12A:
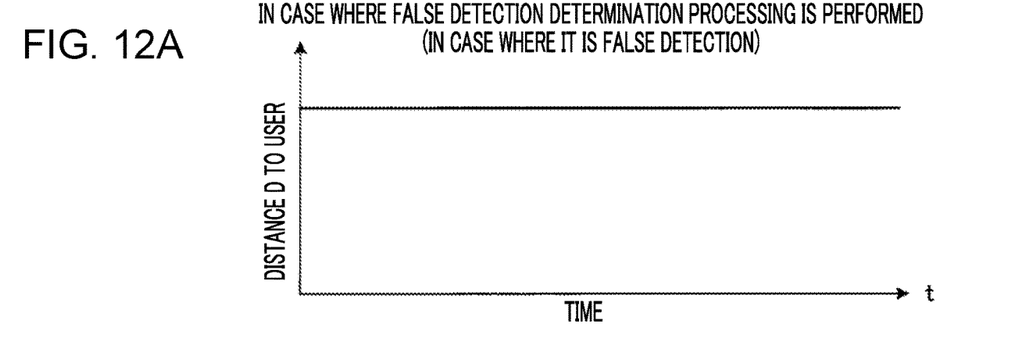
Figure 12B:
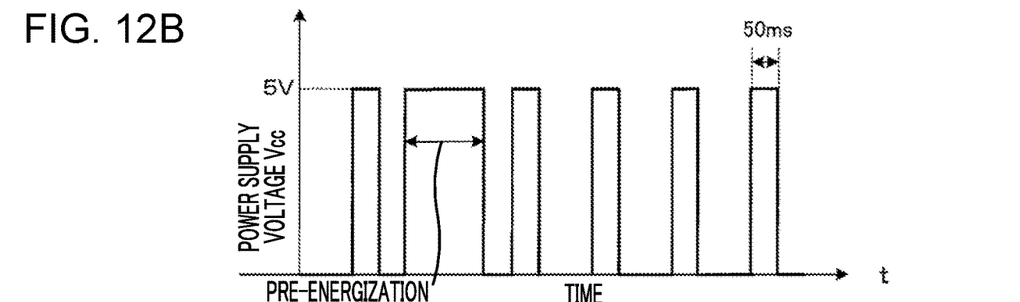
Figure 12C:
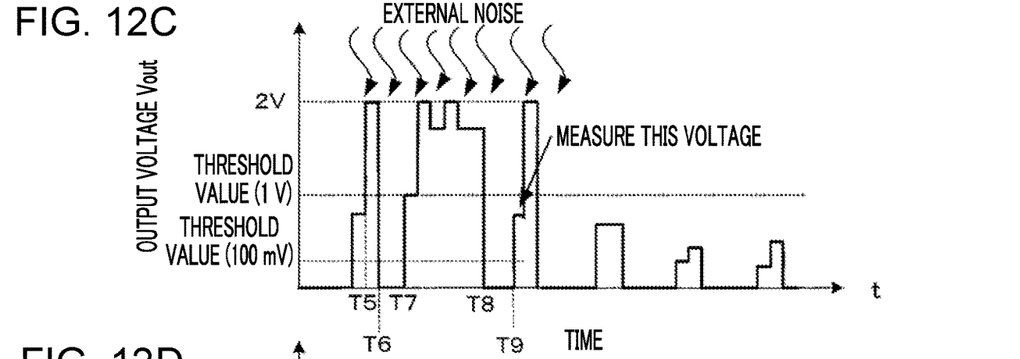
Figure 12D:
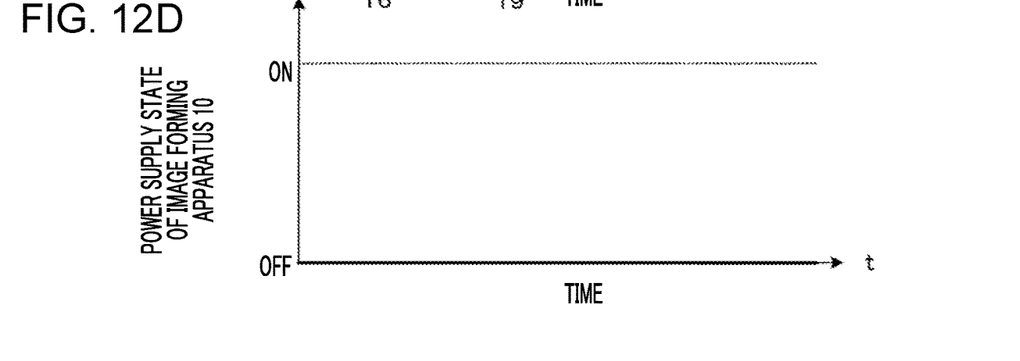

Next, a case where the output voltage Vout exceeding 1 V is a false detection will be described with reference to FIGS. 12A-12D.

Although the user has not approached the image forming apparatus 10, the voltage value of the output voltage Vout exceeds 1 V at time T5 due to the influence of external noise. Then, at time T6, the control unit 50 turns off the power supply voltage Vcc. After 50 ms, at time T7, the control unit 50 turns on the power supply voltage Vcc to perform pre-energization for 150 ms.

After the pre-energization, the control unit 50 turns off power supply voltage Vcc at time T8. Then, the control unit 50 turns on the power supply voltage Vcc at time T9 after 50 ms has elapsed.

Then, the control unit 50 measures the voltage value of the transient response of the output voltage Vout immediately after turning on the power supply voltage Vcc. In FIGS. 12A-12D, a voltage value of about 800 mV is measured as the voltage value of the transient response of the output voltage Vout, and it can be seen that the output voltage Vout is equal to or higher than 100 mV, which is the threshold value, when it is determined that false detection has occurred.

Therefore, the control unit 50 determines that the current output voltage Vout of 1 V or more is a false detection and keeps the power of the image forming apparatus 10 off without turning on.

As a result, even though the distance measurement sensor 40 performs false detection, the control unit 50 can avoid a false operation of turning on the power of the image forming apparatus 10.

MODIFICATION EXAMPLE

In the above exemplary embodiment, a case where the present disclosure is applied to the image forming apparatus 10 has been described, but the present disclosure is not limited to such a case, and the present disclosure can be similarly applied to an information processing apparatus such as an automatic teller machine (ATM) apparatus or a ticket vending machine where a user approaches and performs an operation.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a distance measurement sensor that outputs a voltage according to a distance to a measurement object; and
   a control unit that:
      performs control to determine that the measurement object has approached the apparatus in a state where an output voltage from the distance measurement sensor is equal to or higher than a preset threshold value, wherein the control unit repeatedly:
         (i) supplies power to the distance measurement sensor at preset intervals and stops power supply to the distance measurement sensor after a preset first period during which power is supplied has elapsed, and
         (ii) supplies power again and stops the power supply to the distance measurement sensor after a preset second period has elapsed; and
      then performs control to determine that the output voltage from the distance measurement sensor is a falsely detected output voltage when the output voltage during power supply to the distance measurement sensor is equal to or higher than a preset voltage.

2. The information processing apparatus according to claim 1, wherein
   the second period is set to be longer than the first period.

3. The information processing apparatus according to claim 2, wherein
   the second period is set to be three or more times longer than the first period.

4. The information processing apparatus according to claim 1, wherein
   the control unit stops power supply to the distance measurement sensor after repeating a power supply state during the second period a plurality of times, and then determines that the output voltage from the distance measurement sensor is a falsely detected output voltage when the output voltage during power supply to the distance measurement sensor is equal to or higher than a preset voltage.

5. The information processing apparatus according to claim 4, wherein
   the control unit sets different power supply periods during a plurality of the second periods.

6. The information processing apparatus according to claim 4, wherein
   the control unit sets different supply voltages to a power source of the distance measurement sensor during a plurality of the second periods.

7. The information processing apparatus according to claim 1, wherein
   the control unit
      stops power supply to the distance measurement sensor after the preset first period has elapsed in a state where the output voltage from the distance measurement sensor is equal to or higher than the preset threshold value,
      supplies power again and stops the power supply to the distance measurement sensor after the preset second period has elapsed, and then repeatedly determines whether or not the output voltage during power supply to the distance measurement sensor is equal to or higher than the preset voltage a plurality of times, to determine whether or not detection of the measurement object by the distance measurement sensor is false detection based on results of a plurality of times of determination.

8. The information processing apparatus according to claim 1, wherein the control unit performs control to turn on the power of the apparatus when the output voltage from the distance measurement sensor is equal to or higher than the preset threshold value, and does not perform control to turn on the power of the apparatus, when determining that the output voltage from the distance measurement sensor is a falsely detected output voltage, even though the output voltage from the distance measurement sensor is equal to or higher than the preset threshold value.

* * * * *